Figure 1:
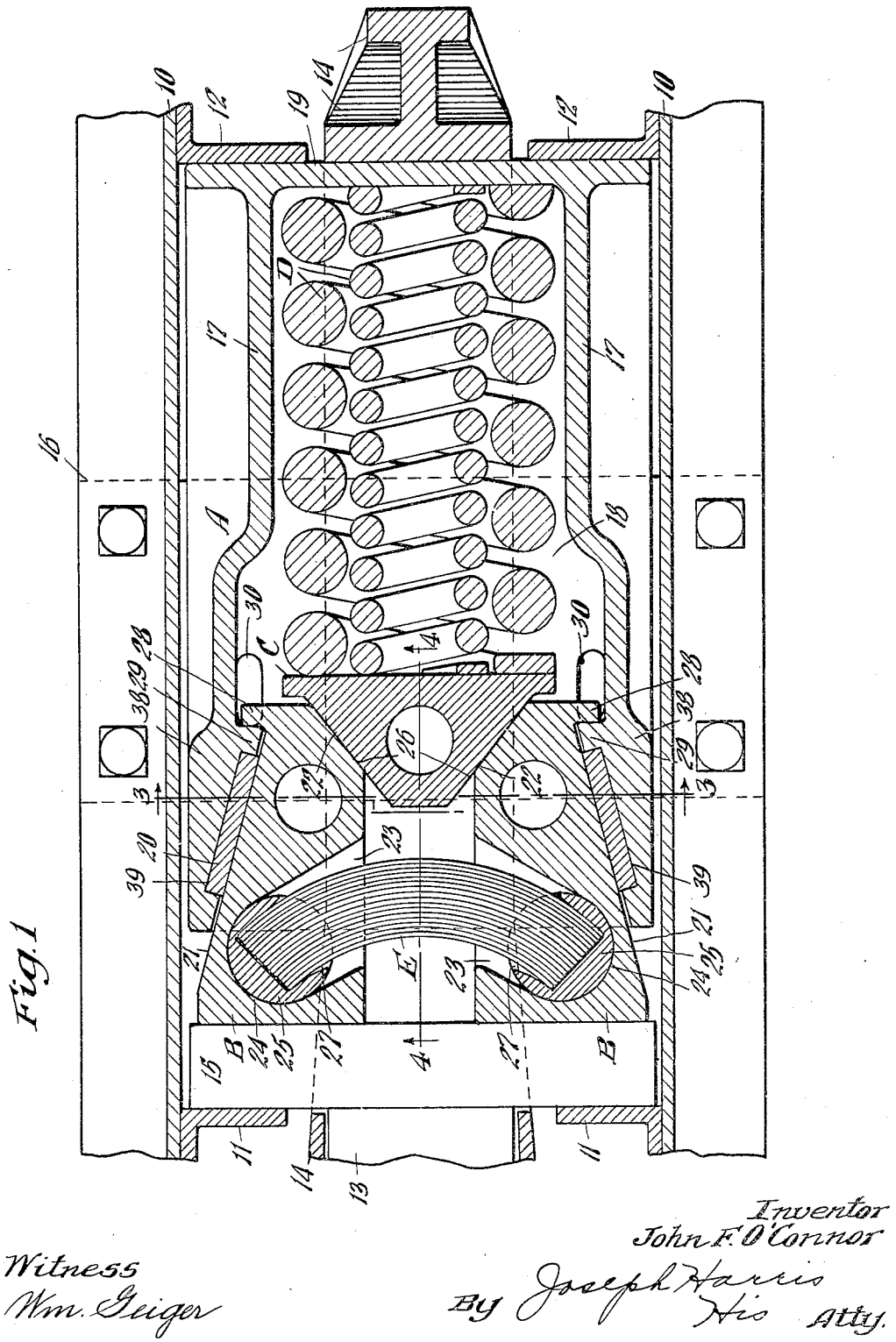

June 14, 1932.　　　　J. F. O'CONNOR　　　　1,862,764

FRICTION SHOCK ABSORBING MECHANISM

Filed May 31, 1928　　　2 Sheets-Sheet 1

Witness
Wm. Geiger

Inventor
John F. O'Connor
By Joseph Harris
His Atty.

June 14, 1932.   J. F. O'CONNOR   1,862,764
FRICTION SHOCK ABSORBING MECHANISM
Filed May 31, 1928   2 Sheets-Sheet 2
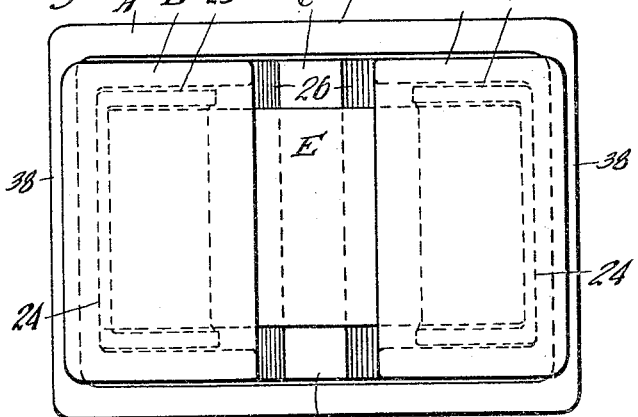
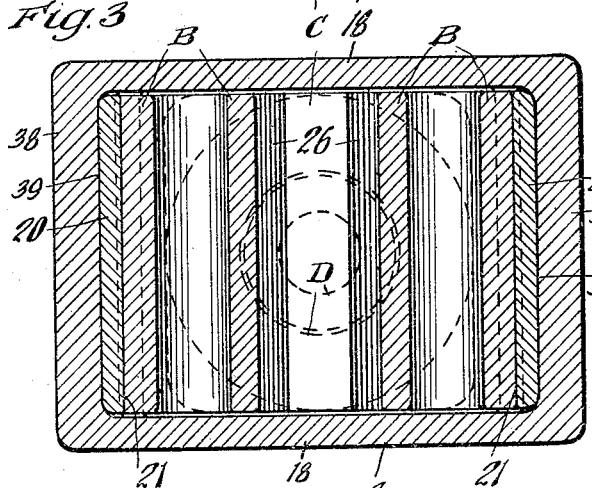
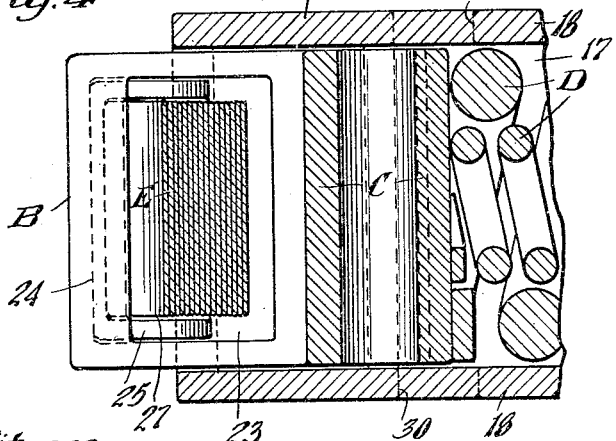
Witness
Wm. Geiger
Inventor
John F. O'Connor
By Joseph Harris
His Atty.

Patented June 14, 1932

1,862,764

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 31, 1928. Serial No. 281,770.

This invention relates to improvements in friction shock absorbing mechanisms.

One object of the invention is to provide a friction shock absorbing mechanism, especially adapted for railway draft riggings, including a casing provided with interior, opposed wedge friction surfaces, a pair of wedge friction shoes cooperating with the wedge surfaces of the casing, a main spring resistance and spring means opposing lateral approach of the shoes, wherein the shoes directly receive the actuating force and the spring means which opposes lateral approach of the shoes is composed of a plurality of transversely disposed spring plates interposed between the shoes and adapted to be flexed upon relative approach of the shoes, the spring plates being thus placed under load endwise, thereby reducing the strain on the plates and permitting the use of relatively light plate members.

Other and further objects of the invention will more clearly appear from the description and claims hereinafter following.

In the drawings, forming a part of this specification, Figure 1 is a horizontal, longitudinal, sectional view of a portion of the underframe structure of a railway car, at one end thereof, illustrating my improvements in connection therewith. Figure 2 is a front end elevational view of my improved shock absorbing mechanism proper. Figure 3 is a transverse, vertical, sectional view, corresponding substantially to the line 3—3 of Figure 1. Figure 4 is a longitudinal, vertical, sectional view of the front end portion of the shock absorbing mechanism shown in Figure 1, corresponding substantially to the line 4—4 of said figure. And Figure 5 is a view similar to Figure 1, of the front end portion of the shock absorbing mechanism, illustrating another embodiment of the invention.

Referring first to the embodiment of the invention illustrated in Figures 1 to 4, inclusive, 10—10 indicate the usual channel-shaped center or draft sills of a railway car underframe, to the inner sides of which are secured front stop lugs 11—11 and rear stop lugs 12—12. The inner end of the coupler shank is designated by 13, to which is operatively connected a yoke member 14 of well known form. My improved shock absorbing mechanism proper and a front main follower 15 are disposed within the yoke and the yoke in turn is supported by a detachable saddle plate 16 secured to the bottom flanges of the draft sills 10.

My improved shock absorbing mechanism proper, as illustrated in Figures 1 to 4, inclusive, comprises, broadly, a casing A; a pair of friction shoes B—B; a spring follower C; a main spring resistance D; and a laminated plate spring E.

The casing A is of substantially rectangular, elongated, box-like form, having longitudinally disposed, spaced side walls 17—17, horizontally disposed, spaced, longitudinally extending top and bottom walls 18—18 and a transverse rear end wall 19. The end wall 19 has the extremities thereof projecting beyond the side walls and cooperates with the stop lugs 12 in the manner of the usual rear follower. The front end portions of the side walls are laterally offset and thickened, as indicated at 18.

On the inner sides, the wall sections 38 are recessed, as indicated at 39, to accommodate liners 20. The inner portions of the side wall sections 38 are inclined with respect to the longitudinal axis of the mechanism, as shown, and the opposed surfaces of the wall sections 38 converge inwardly of the mechanism. As shown, each liner is so mounted on the corresponding side wall section as to have the exposed surface thereof inclined correspondingly to the inner surface of said side wall section. It will be evident that the two liners thus present opposed faces which converge inwardly of the mechanism. The inclination of the opposed faces of the liners is such as to provide a substantial wedging action.

The friction shoes B are arranged at opposite sides of the mechanism and each shoe is provided with a flat front end face which bears directly on the inner side of the front main follower 15. Each shoe B is provided with an outer friction wedge face 21 which cooperates with the wedge face of the corresponding liner 20. At the inner end, each shoe is provided with a wedge face 22 on the inner side thereof, which cooperates with the spring follower C.

Each shoe is also provided with a pocket 23 adjacent the front end thereof, which opens inwardly, as shown, the pocket having a rounded inner end wall 24 which forms a bearing seat for a substantially cylindrical bearing block 25 forming a support for the corresponding end of the group of spring plates E.

The spring follower C is in the form of a heavy block having a flat transverse rear end face which bears on the main spring resistance and forwardly converging wedge faces 26—26 at the front thereof, cooperating respectively with the wedge faces 22 at the inner ends of the two frictiion shoes B.

A main spring resistance, which comprises an inner and an outer coil, as shown, is interposed between the spring follower C and the transverse end wall 19 of the casing A.

The laminated plate spring E is composed of a plurality of transversely disposed, curved, plate spring members, which are nested, as shown, and have their opposite ends seated in bearing pockets 27 provided in the blocks 25. As clearly illustrated in Figure 1, the pockets 23 have the side walls thereof spaced apart a sufficient distance to permit the necessary flexing of the group of spring plates E during the full compression stroke of the mechanism.

In order to maintain the parts assembled, the two friction wedge shoes B are provided with laterally outwardly extending flanges 28 at the rear ends, adapted to engage in back of limiting stop shoulders 29 at the inner ends of the enlarged sections of the side walls of the casing A.

In order to facilitate the removal of the friction wedge system from the casing, I provide the top and bottom walls of the casing with aligned openings 30 immediately in back of the shoulders 29 of the side walls. The openings 30 are provided to permit the insertion of a pair of guide keys which form guides to prevent engagement of the lugs 28 of the shoes with the stop shoulders of the casing. As will be evident, when the mechanism is compressed to an extent to bring the lugs 28 inwardly beyond the recesses 30, and the guide keys or bars are inserted through the openings or recesses 30, the outer faces of the bars will present guide surfaces which will engage the lugs 28 when the shoes are moved outwardly and guide these lugs past the shoulders 29. In order to remove the friction wedge shoes B and associated parts after the guide keys have been placed in position, it is merely necessary to release the pressure on the outer ends of the shoes, thereby permitting the spring resistance D to eject the shoes and associated parts.

My improved friction shock absorbing mechanism, as illustrated in Figures 1 to 4, inclusive, operates as follows, assuming a compression stroke: The main follower 15 and the casing will be moved relatively toward each other, thereby forcing the friction wedge shoes B inwardly on the friction surfaces of the liners. Inward movement of the shoes will be resisted by the main spring D. Due to the converging relation of the opposed surfaces of the two liners, the shoes will approach each other during their inward movement, thereby compressing the group of spring plates E endwise and causing the same to be flexed. Additional friction is created during the relative approach of the friction shoes by the cooperating faces of the shoes and the main follower 15. Due to the relative approach of the shoes, the spring follower C will be squeezed out from between the shoes, thereby providing friction on the cooperating engaging faces of the shoes and spring follower and, in addition, compressing the main spring.

By providing the bearing blocks 25, in which the outer ends of the spring plates are mounted, excessive wear of the walls of the pockets of the shoes is effectively prevented, inasmuch as the end edges of the spring plates are seated in pockets in the bearing members 25.

Referring next to the embodiment of the invention illustrated in Figure 5, the same comprises, broadly, a casing F; a pair of friction wedge shoes G—G; a spring follower H; a main spring resistance J; and two laminated plate springs K—K.

The casing F is of substantially the same design as the casing A, hereinbefore described, and the side wall sections at the forward end of the casing are provided with detachable, interior, liners 31—31 which present interior, longitudinally disposed, flat surfaces 32—32. The surfaces 32 converge inwardly of the mechanism and are disposed at such an angle as to produce a wedging action.

The friction wedge shoes G—G are disposed at opposite sides of the casing and cooperate respectively with the two liners 31—31. At the front end, each friction wedge shoe G has a flat transverse face which cooperates with the main follower in the same manner as the flat front end faces of the shoes B, hereinbefore described. On the outer side, each shoe has a longitudinally disposed, flat face 33 which cooperates with the flat face of the liner at the corresponding side of the casing. The inner ends of the shoes G bear directly on the spring follower H, which is in the form of a heavy, flat, rectangular plate engaging the front ends of the two coils of the main spring resistance J.

As shown, the shoes G are recessed on the inner sides to provide pockets 34—34. Each pocket has a vertically disposed central rib 35 which divides the pocket into two sections. The front and rear end walls of the pockets are curved, as shown, and the top and bottom walls are spaced apart such a distance as to accommodate the plate springs K therebetween.

As shown, the two laminated plate springs are interposed between the friction wedge shoes G. Each group comprises a plurality of transversely disposed, curved plates in nested relation, so as to provide, in effect, a single curved spring member. The two groups of spring plates K—K are reversely arranged, so that the concave sides of the groups are opposed. As clearly shown in Figure 5, clearance is provided between the outermost plates of the two groups and the front and rear end walls of the pockets of the friction wedge shoes G, so that the plates may be flexed to the required extent during the full compression of the mechanism. The opposite ends of the plates of each group extend an appreciable distance into the pockets so that the plates are retained in operative position and the outer end edges of the plates bear on the longitudinal walls of the pockets of the shoes G. The parts are so proportioned, and the number of plates contained in each group forming the laminated plate spring structure is such, that the ends of the plates of each group will be held against longitudinal displacement between the dividing ribs of the pockets and the inner ends of the curved end walls.

As shown, the spring follower has the front face thereof recessed to provide a curved pocket 36 which accommodates the rear central portion of the rear group of spring plates K when the same are flexed during the latter part of the compression stroke of the mechanism. The spring follower is also provided with a central, rearwardly extending boss 37, which engages within the inner coil of the spring resistance to center the same.

The operation of the embodiment of the invention illustrated in Figure 5, during a compression stroke, is substantially the same as that hereinbefore described in connection with Figures 1 to 4, inclusive. It will be evident that during the compression of the mechanism, the two groups of plate springs K will be flexed in opposite directions.

By providing the laminated plate springs with the plates forming the spring members arranged transversely of the mechanism, the load is placed on the plates endwise, thereby reducing the fibre stresses to which the plates are subjected, adding to the life of the laminated plate springs and also permitting the use of relatively thin plates.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a casing having opposed, interior wedge faces; of a pair of shoes laterally movable toward each other and directly receiving the actuating force, having wedging engagement with said wedge faces and being slidable lengthwise thereon; spring resistance means opposing inward movement of the shoes; and means yieldingly opposing relative approach of the shoes, including a group of curved spring plates interposed between said shoes and bearing on said shoes only, said spring plates being arranged transversely of the mechanism and having their opposite ends bearing on said shoes.

2. In a friction shock absorbing mechanism, the combination with a casing having interior, inwardly converging, opposed surfaces; of a pair of shoes having sliding engagement with said surfaces; a main spring resistance opposing inward movement of the shoes; and means yieldingly holding said shoes separated and opposing relative approach of the same, including a group of nested, transversely disposed, curved spring plates, having their opposite ends buttressed on and anchored to said shoes, said plates being supported only by said shoes.

In witness that I claim the foregoing I have hereunto subscribed my name this 28th day of May, 1928.

JOHN F. O'CONNOR.